United States Patent [19]

Lee

[11] Patent Number: 5,694,269
[45] Date of Patent: Dec. 2, 1997

[54] SPINDLE MOTOR HUB ASSEMBLY OF HARD DISK DRIVE

[75] Inventor: Nae-Joon Lee, Suwon, Rep. of Korea

[73] Assignee: SamSung Electronics Co., Ltd., Suwon, Rep. of Korea

[21] Appl. No.: 602,456

[22] Filed: Feb. 16, 1996

[30] Foreign Application Priority Data

Apr. 24, 1995 [KR] Rep. of Korea .................. 9630/1995

[51] Int. Cl.$^6$ .............................................. G11B 17/022
[52] U.S. Cl. ............................ 360/98.08; 360/99.05; 360/99.12
[58] Field of Search .................. 360/98.07, 98.08, 360/99.04, 99.05, 99.08, 99.12; 369/270, 271, 282, 289, 290

[56] References Cited

U.S. PATENT DOCUMENTS

| | | | |
|---|---|---|---|
| 4,755,981 | 7/1988 | Ekhoff | 369/270 |
| 4,933,927 | 6/1990 | Ross | 369/270 |
| 5,031,061 | 7/1991 | Hatch | 360/98.07 |
| 5,136,450 | 8/1992 | Moir | 360/135 |
| 5,148,338 | 9/1992 | Frugé | 360/98.07 |
| 5,155,640 | 10/1992 | Lee | 360/98.07 |
| 5,189,577 | 2/1993 | Nishida et al. | 360/106 |
| 5,274,517 | 12/1993 | Chen | 360/98.08 |
| 5,295,029 | 3/1994 | Elsing et al. | 360/99.08 |
| 5,305,163 | 4/1994 | Holm | 360/98.01 |
| 5,317,225 | 5/1994 | Miyaji et al. | 360/98.08 X |
| 5,392,178 | 2/1995 | Nishio et al. | 360/99.08 |
| 5,422,768 | 6/1995 | Roehling et al. | 360/98.08 |
| 5,517,376 | 5/1996 | Green | 360/98.08 |

FOREIGN PATENT DOCUMENTS 2093625 9/1982 United Kingdom .................. 369/271

OTHER PUBLICATIONS

Besha et al, "Disk Pack Compliance Clamp", Jul. 1978, IBM Technical Disclosure Bulletin, vol. 21 No. 2, pp. 802–803.

Reidenbach, "Method For Disk File Disk Clamping", Nov. 1981, IBM Technical Disclosure Bulletin, vol. 24 No. 6, pp 2765–2766.

*Primary Examiner*—Stuart S. Levy
*Assistant Examiner*—William R. Korzuch
*Attorney, Agent, or Firm*—Robert E. Bushnell, Esq.

[57] ABSTRACT

An improved disk drive spindle hub assembly for a hard disk drive includes a spindle hub having a generally annular groove with an internal thread formed therein, on a top surface and a portion of the top surface radially outward from the annular groove forming an upwardly extending peripheral ring. A stack of information storage disks is journaled about the spindle hub in a spaced-apart, vertically aligned relation. Annular spacers are positioned between adjacent ones of the information storage disks in order to space the disks apart in the vertically aligned relation of the spindle hub. A disk clamp configured to concentrically clamp the stack of information storage disks in axial alignment with the spindle hub. The disk clamp is fabricated from a single piece to include a head portion, a downwardly projecting peripheral ring having a bottom surface facing a surface of a top annular spacer, and a cylindrical post extending from the center of the head portion and having an external thread formed thereon for allowing mutual engagement with the internal thread formed in the annular groove of the spindle hub, so that when that disk clamp is screwed on the spindle hub, the stack of information storage disks is concentrically secured to the spindle hub.

12 Claims, 4 Drawing Sheets

SPINDLE MOTOR HUB ASSEMBLY OF HARD DISK DRIVE

CROSS-REFERENCE TO RELATED APPLICATIONS

This application makes reference to, incorporates the same herein, and claims all benefits accruing under 35 U.S.C. §119 from an application for *Disk Fixing Structure Of Hard Disk Drive* earlier filed in the Korean Industrial Property Office on 24 Apr. 1995 and there duly assigned Ser. No. 9630/1995.

BACKGROUND OF THE INVENTION

1. Technical Field

The present invention relates to an improved hard disk drive for use as an auxiliary memory in a computer and, more particularly, to an improved spindle hub assembly for mounting storage disks for rotation within the hard disk drive.

2. Background Art

Generally, disk drives can be grouped into magnetic disk drives such as a floppy disk drive and a hard disk drive which are used as an auxiliary memory in a computer, and optical disk drives such as a compact disk-read only memory (CD-ROM) and a magneto optical disk drive which are used as media in a multimedia environment including audio, video and alike.

In a hard disk drive used as an auxiliary memory for a computer, a magnetic head floating on a recording surface of the magnetic disk at a predetermined flying height operates to record and reproduce data on the magnetic disk in response to a magnetic flux. Accordingly, in order to increase data storage capacity of the magnetic disk drive and other data storage devices, it is very important that a recording density of the magnetic information on the magnetic disk is enhanced, and that the magnetic disk drive is packaged with as many disks as possible.

As the recording density of magnetic disks is enhanced however, the flying height of the magnetic head becomes inversely minimal. A standard minimum flying height of the magnetic head is approximately 0.2 μm or so. Thus, the stability of the head flying height must be accurately maintained in order to realize a large capacity construction and high reliability of the magnetic disk drive. This requires a high degree of flatness of a rotating magnetic disk which can be ascribed to the way in which the disk is mounted to a hard disk spindle assembly. Such a spindle assembly as disclosed, for example, in U.S. Pat. No. 5,295,029 for *Disk Drive Including Unitary Deck For Aligning And Supporting Axially Retractable Spindle Assembly* issued to Elsing et at., U.S. Pat. No. 5,189,577 for *A Magnetic Disk Apparatus And A Motor Securement Therefor* issued to Nishida et at., U.S. Pat. No. 5,136,450 for *Disk Pack Assembly Having A Laminate Sleeve Disposed Between A Spindle And A Disc For Reducing Radial Disc Displacement* issued to Moir, and U.S. Pat. No. 5,031,061 for *Disk Drive Hub Assembly* issued to Hatch, typically includes a rotatable spindle hub that is carded by a fixed spindle shaft securely mounted to the housing. A plurality of information storage disks are journaled about the spindle hub. Spacer disks are provided between adjacent information storage disks. The vertically aligned information storage disks are clamped to the spindle hub by a disk clamp secured by a plurality of screws.

In practice, the disk clamp design in relation with the hard disk spindle assembly is critical to high performance disk drives. Consequently there are several design criteria that must be met in order to provide an effective disk clamp. Specifically, the disk clamp must provide a uniform clamping force along its clamping surface to avoid problems such as top disk distortion. The disk clamp must also be designed to uniformly distribute its internal stress in order to minimize clamping force variations due to thermal expansions. Many conventional disk clamp designs in which screws are used to secure the disk clamp to the spindle hub such as those for example, disclosed in Elsing et at. '029, Nishida et at. '450, Moir '450, and Hatch '061, tend to loosen after time and stress imbalances within the clamp.

More recent disk clamp designs such as disclosed, for example, in U.S. Pat. No. 5,392,178 for *Motor For A Disc Driving Device Having A Hub Positioned On Inner Race Of An Upper Bearing* issued to Nishio et at., and U.S. Pat. No. 5,274,517 for *Disk Clamp With Annular Spring Section* issued to Chen are better served to provide a uniform clamping force and minimize stress concentrations within the disk clamp. For example, Chen '517 discloses a disk clamp that includes a substantially flat inner ring, an outer ring having a rounded engaging surface and a circular convex spring section that couples the inner ring section to the outer ring section. When installed on the top portion of the spindle hub by a plurality of screws through corresponding screw holes of the inner ring section, the disk clamp will contact at the rounded engaging surface of the dome-shaped resilient spring section in order to minimize adverse consequences to the disks. Similarly, Nishio et at. '178 also a disk clamp that acts as a plate spring for securing the plurality of information storage disks to the spindle hub. In Nishio et al. '178 however, the disk clamp is secured to the spindle hub way a single screw, rather than a plurality of screws, mounted to a center bore of the spindle hub. Such conventional disk clamp designs, as I have observed, suffer a number of drawbacks. First, the construction of such a hard disk spindle motor assembly is not efficient because the disk clamp is required to be secured to the top of the spindle motor hub by screws. Second, operational errors may occur during recording and reproduction of data when the flatness of the storage disk is not enhanced. Third, the clamped storage disk may be deformed if the pressure asserted by the screws onto the disk clamp is too extreme.

While there are other variations of disk clamp and spindle hub structures that are known in the art such as those disclosed, for example, in U.S. Pat. No. 5,305,163 for *Stationary Angularly Aligned Stationary Spindle Shaft* issued to Holm, and U.S. Pat. No. 5,155,640 for *Disk Spindle Motor Cap* issued to Lee, it is my observation that further improvement can be contemplated.

SUMMARY OF THE INVENTION

Accordingly, it is therefore an object of the present invention to provide an improved hard disk drive.

It is another object to provide a novel disk clamp structure for a hard disk drive that minimizes adverse influence imposed on the disk flatness when a single data storage disk or a stack of multiple data storage disks are mounted on a spindle assembly.

It is also an object of the present invention to provide a novel disk clamp design that minimizes stress concentrations and clamp force variations of a stack of information storage disks.

It is further an object of the present invention to provide a hard disk spindle hub assembly that minimizes assembly time and attendant costs.

These and other objects may be achieved with a disk drive spindle hub assembly constructed according to the principles of the present invention with a spindle hub having a generally annular groove with an internal thread formed therein, on a top surface and a portion of said top surface radially outward from said annular groove forming an upwardly extending peripheral ring. A stack of information storage disks is journaled about the spindle hub in a spaced-apart, vertically aligned relation. Annular spacers are positioned between adjacent ones of the information storage disks in order to space the disks apart in the vertically aligned relation of the spindle hub. A disk clamp configured to concentrically clamp the stack of information storage disks in axial alignment with the spindle hub. The disk clamp is fabricated from a single piece to include a head portion, a downwardly projecting peripheral ring having a bottom surface facing a surface of a top annular spacer, and a cylindrical post extending from the center of the head portion and having an external thread formed thereon for allowing mutual engagement with the internal thread formed in the annular groove of the spindle hub, so that when that disk clamp is screwed on the spindle hub, the stack of information storage disks is concentrically secured to the spindle hub. The annular spacers are configured to be resilient for enabling the information storage disks to expand and contract radially in relative to the spindle hub to avoid axial and radial displacements of the clamped information storage disks.

In one embodiment of the present invention, the head portion of said disk clamp is configured in a doughnut-shape having a perforated hole at the center region extending through a cylindrical post that is hollow in order to tighly accommodate an inner cylindrical wall of the annular groove of the spindle hub, when the disk clamp is screwed on the spindle hub for concentrically securing the stack of information storage disks to the spindle hub. The disk clamp may also contain a plurality of screw holes for allowing corresponding screws to additionally secure the disk clamp after the disk clamp is secured on the spindle hub by the mutual engagement of the internal thread formed in the annular groove of the spindle hub and the external thread formed on the hollow cylindrical post of the disk clamp.

In another alternative embodiment, the head portion of the disk clamp is configured in a dome-shaped and the cylindrical post of said disk clamp is made solid for securely accommodating mutual engagement of the internal thread formed in the annular groove of the spindle hub and the external thread formed on the solid cylindrical post of the disk clamp.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
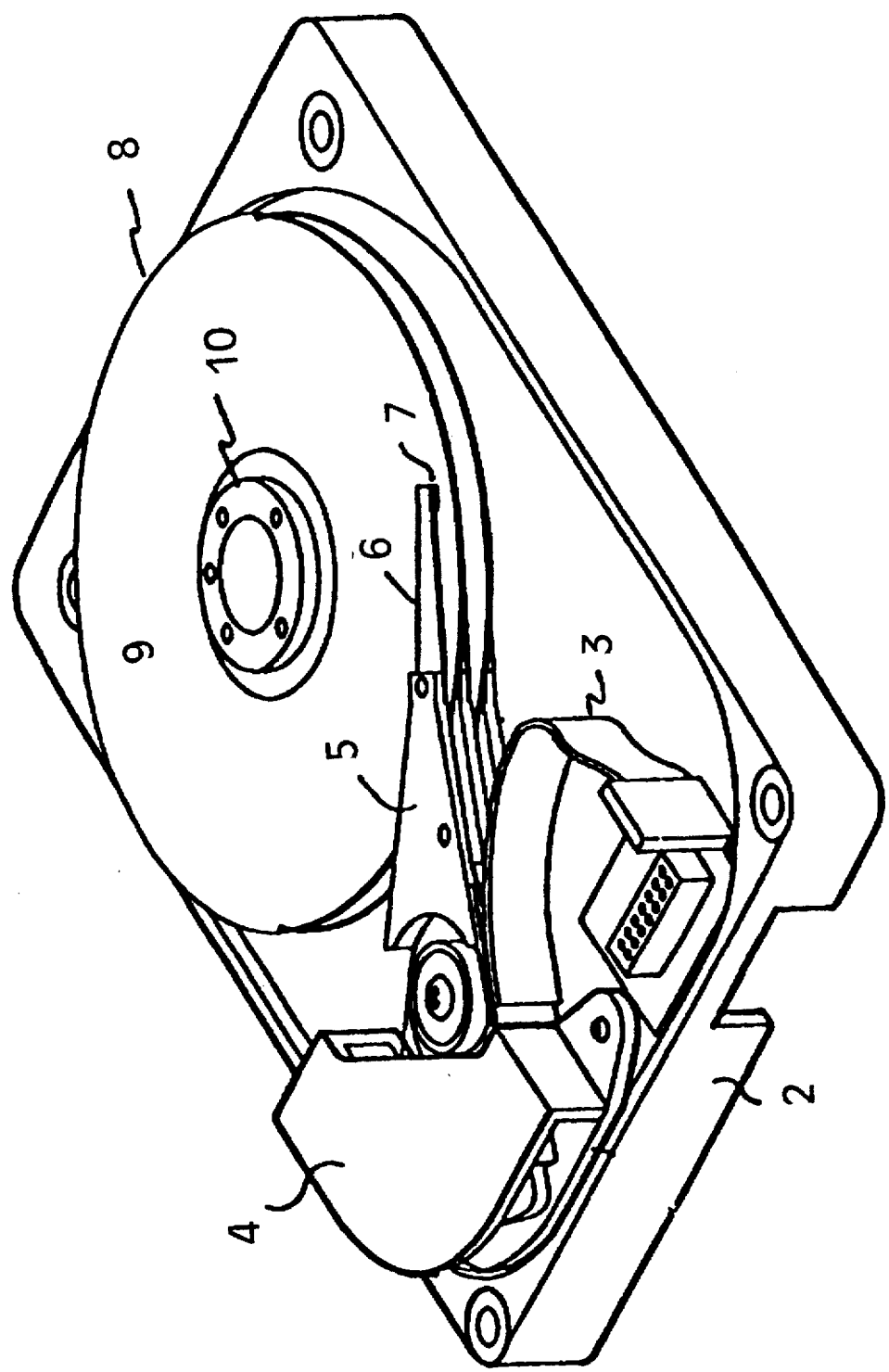
FIG. 1 is a perspective view illustrating a salient features in an abstract representation of a typical hard disk drive.
Figure 2:
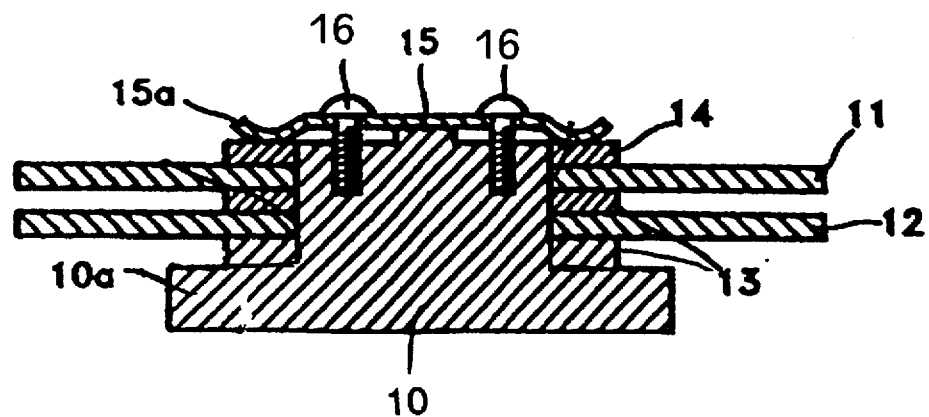
FIG. 2 is a cross-sectional view showing an abstract representation of a conventional spindle hub assembly of a hard disk drive.

Referring now to the drawings, and referring to FIGS. 1 and 2, a hard disk drive such as a Winchester-type suitable for use with a microcomputer, is constructed with a generally, rectangularly shaped base 2 serving as a frame providing a major interior surface accommodating a plurality of information storage disks 8 coaxially mounted in a stack upon a spindle hub assembly 10 driven by a motor (not shown) mounted on base 2 to provide a plurality of cylindrical base surfaces 9 that serve as a memory into which binary information may be written and read, an actuator 5 mounted upon base 2, a voice coil motor 4 positioned to respond to electrical control signals and thereby arcuately displace a proximal end of actuator 5, and a multi-lead flexible ribbon cable 3 electrically coupling arm with the corresponding terminal pins of terminal. Actuator arm 6 supports, at its distal end, a plurality of electromagnetic transducers commonly known as read and write actuator heads 7 corresponding to the distinct separate cylindrical base surfaces 9 of disks 8 that serves as memories. In the embodiment of the disk drive chosen for the purpose of illustration, two information storage disks are utilized. The information storage disks 8 include a top storage disk 11 and a bottom storage disk 12 as shown in FIG. 2. The spindle motor assembly includes a non-rotating spindle shaft (not shown) that is securely fastened to the base 2. A rotatable spindle motor hub 10 is journaled about the spindle shaft. The spindle hub 10 includes an enlarged spindle base portion 10a for supporting the bottom information storage disk 12 as the stack of information storage disks 8 are journaled about the spindle hub 10. A spacer 13 which is sized appropriately to be tightly journaled about the spindle hub is then placed over the spindle motor hub 10 above the bottom information storage disk 12. The remaining information storage disk 11 is then placed over the spindle motor hub 10 with the spacer 13 disposed between adjacent disks. The top information storage disk 11 and the clamp spacer 14 are successively placed about the spindle motor hub 10, and a disk clamp 15 is placed over the top of the clamp spacer 14. Disk clamp 15 is then secured to the top portion of the spindle motor hub 10 by a plurality of screws 16. The disk clamp 15 as shown in FIG. 2 is typically annular and concentric about its radial axis. This type of disk clamp 15 may or may not include an annular central opening for a tight fit about the top portion of the spindle motor hub 10. The disk clamp 15, however, includes a substantially flat inner plate and an extending circular convex spring section 15a that serve as a plate spring for controlling application of downward pressure against the surface of the top information storage disk 11 through the clamp spacer 14 as the disk clamp 15 is secured to the top portion of the spindle motor hub 10 by screws 16.

Such a typical disk clamp design, as I have observed however, suffer a number of drawbacks. For example, the construction of such a hard disk spindle assembly is not efficient because the disk clamp is required to be secured to the top of the spindle motor hub by screws. Moreover, operational errors may occur during recording and reproduction of data when the flatness of the storage disk is not enhanced. Further, the clamped storage disk may be deformed if the pressure asserted by the screws onto the disk clamp is too extreme.

Figure 3:
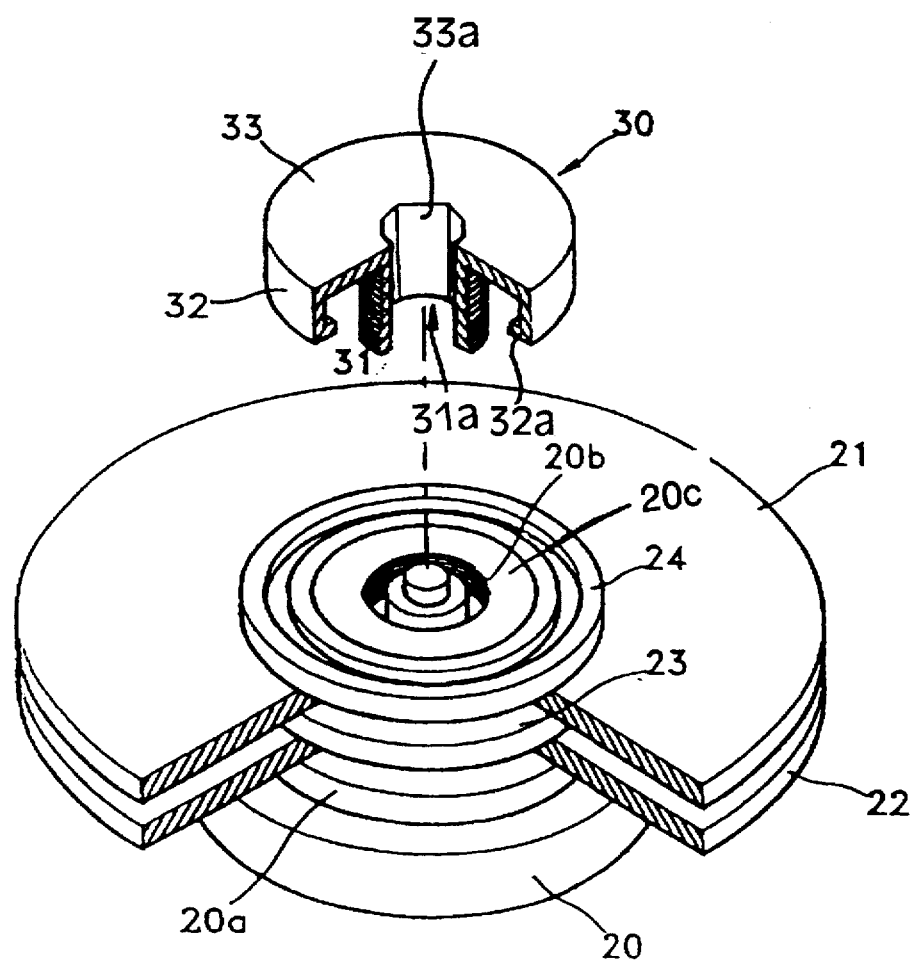
FIG. 3 is an exploded perspective view showing an improved spindle hub assembly of a hard disk drive constructed as one embodiment of the principles of the present invention.
Figure 4:
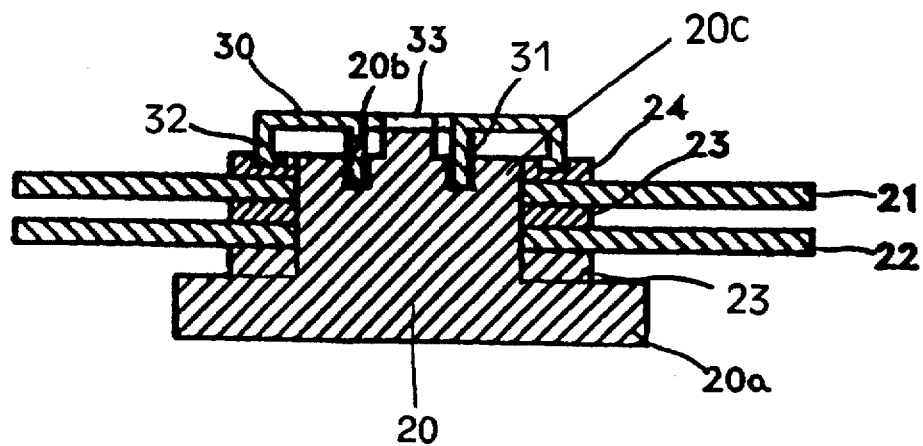
FIG. 4 is a cross-sectional view showing the improved spindle hub assembly of the hard disk drive as shown in FIG. 3.

Turning now to FIGS. 3 and 4, an improved spindle motor hub assembly is shown for a hard disk drive constructed as one embodiment according to the principles of the present invention. A stack of information storage disks 21 and 22 is journaled about a spindle motor hub 20 separated by spacers 23 disposed therein. A spindle motor hub 20 includes a top portion and an enlarged spindle base 20a for mounting onto a base. The top portion has a top end surface and contains therein an annular groove 20b and a remaining portion extending outwardly from the annular groove 20b forming an upwardly extending peripheral ring 20c. The annular groove 20b is machined to have an internal thread formed on its outermost cylindrical wall. A clamp spacer 24 has an annular axial face for facing a surface of a top information storage disk 21 and a central circular opening that allows it to be placed over the top portion of the spindle motor hub 20.

A disk clamp 30 as constructed from a single piece as contemplated by the present invention contains a disk-shaped head or cover portion 33, a downwardly projecting peripheral ring 32 protruding from an outermost periphery of the head portion 33, and a cylindrical post 31 extending from the center of the head portion 33 for insertion into the annular groove 20b of the spindle motor 20. The cylindrical post 31 is configured to contain thereon an external reciprocal thread that allows the disk clamp to be screwed into the annular groove 20b of the spindle motor hub 20 by way of rotation. The downwardly projecting peripheral ring 32 is also configured to exhibit a width or diameter that is greater than the width or diameter of the upwardly extending peripheral ring 20c of the spindle motor hub 20 so that when the disk clamp 30 is screwed into the annular groove 20b of the spindle motor hub 20 by the mutual engagement of the internal thread formed in the annular groove 20b of the spindle motor hub 20 and the external thread formed on the cylindrical post 31 of the disk clamp 30, it accommodates the upwardly extending peripheral ring 20c and applies sufficiently uniform concentric clamping force to the resilient clamp spacer 24 to ensure that the stack of information storage disks 21, 22 to remain in proper axial position along the spindle axis of rotation of the spindle hub as well as in proper radial position along the axis of rotation. In addition, the downwardly projecting peripheral ring 32 has a protruding portion 32a which protrudes toward the cylindrical post 31 at its end brim portion. When the disk clamp 30 is screwed into the annular groove 20b of the spindle motor hub 20, the bottom surface of protruding portion 32a rests upon the upper surface of a corresponding groove formed in clamp spacer 24. The resilient clamp spacer 24 has an annular axial surface that smoothly engages the top information storage disk 21 without presenting any rough edges that can chafe the top disk 21 in the event that the disk clamp 30 moves slightly relative to the top disk 21. Accordingly, the disk clamp structure described will maximize the flatness of the disk surface and minimize adverse influence such as, for example, impact, external shocks and motor vibrations on the disks.

The disk clamp 30 as constructed according to the principle of the present invention generally has a cap-shaped and may be formed from a single blank piece by machining or other equivalent techniques. Moreover, it may be fabricated from a wide range of materials. However, in order to minimaze adverse thermal effects from repeated disk drive operations, the disk clamp 30 is preferably fabricated from the same material as the spindle motor hub 20 which typically includes any aluminum alloy.

In one embodiment of the present invention as shown in FIGS. 3 and 4, the head portion 33 of said disk clamp 30 is configured in a doughnut-shape having a perforated hole 33a at the center region extending through the cylindrical post 31 that is hollow 31a in order to to provide a tightly fit around an inner cylindrical wall of the annular groove 20b of the spindle hub 20, whenever the disk clamp 30 is screwed on the spindle hub 20 by way of rotation. The perforated hole 33a is configured in different sizes and shapes such as, for example a polygonal, hexagonal or octagonal shape in order to make use of available machine tools to clamp the disk clamp 30 tightly to the spindle motor hub 20. For example, if the perforated hole 33a is configured as polygonal, an angular wrench having a corresponding shape similar may be used to clamp the disk clamp 30 to the spindle motor hub 20.

Figure 5:
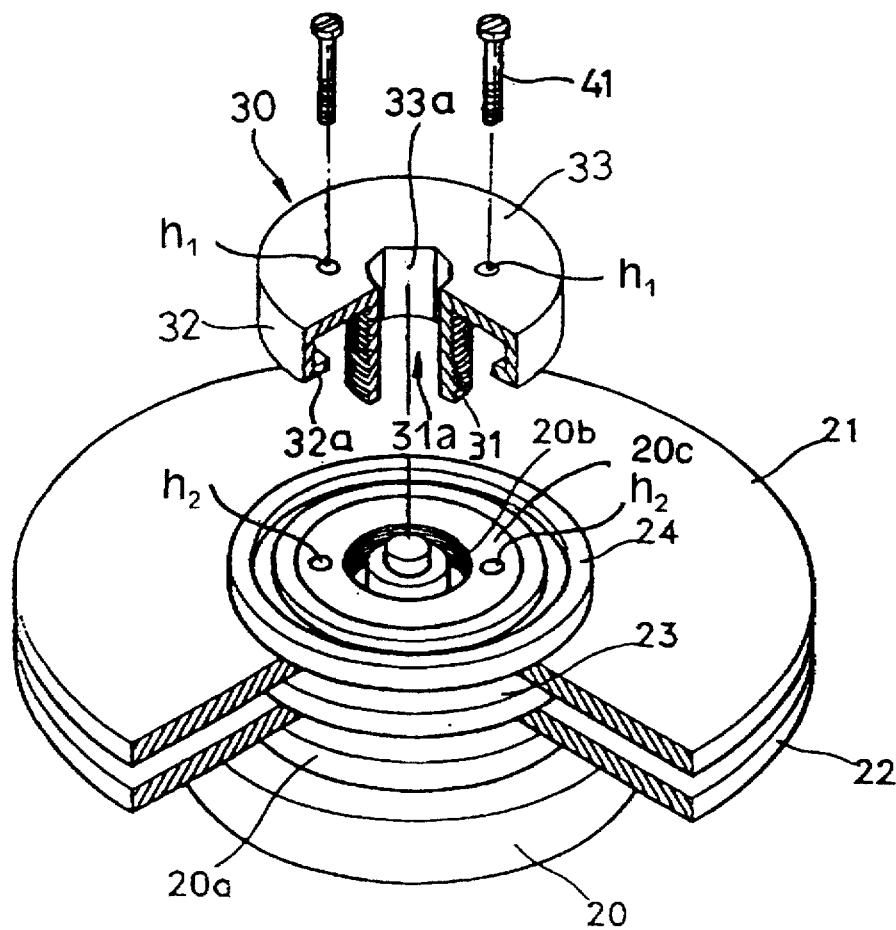
FIG. 5 is an exploded perspective view showing an improved spindle hub assembly of the hard disk drive constructed as another embodiment of the principles of the present invention.

FIG. 5 illustrates an optional clamping mechanism for the disk clamp 30 of FIG. 4. That is, the disk clamp 30 may also contain a plurality of screw holes $h_1$ and the top portion of the spindle motor hub 20 may contain a plurality of corresponding screw holes $h_2$ for allowing optional screws 41 to additionally secure the disk clamp 30 to the spindle motor hub 20 after the disk clamp 30 is secured on the spindle motor hub 20 by the mutual engagement of the internal thread formed in the annular groove 20b of the spindle motor hub 20 and the external thread formed on the hollow cylindrical post 31 of the disk clamp 30.

Figure 6:
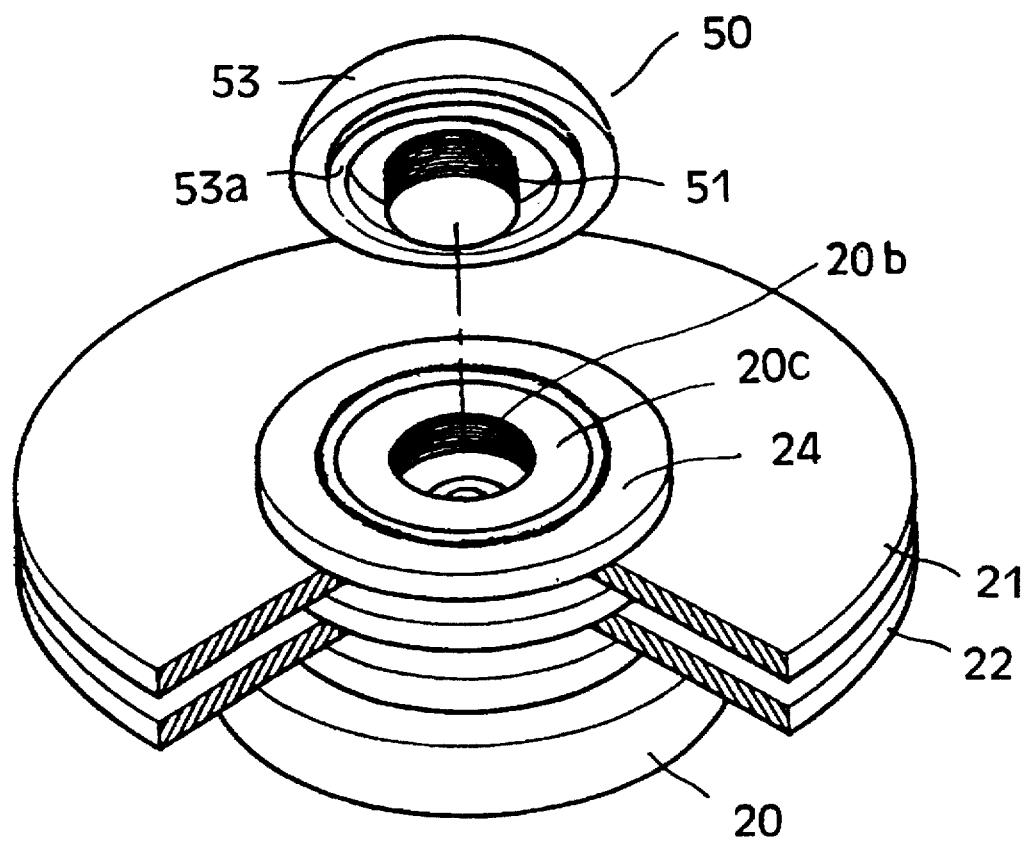
FIG. 6 is an exploded perspective view showing an improved spindle hub assembly for the hard disk drive constructed as still another embodiment of the principles of the present invention.

FIG. 6 illustrates another embodiment of the present invention. In FIG. 6, the head portion of the disk clamp 50 is configured in a dome-shaped member 53 and the cylindrical post 51 of said disk clamp is made solid for securely accommodating mutual engagement of the internal thread formed in the annular groove 20b of the spindle motor hub 20 and the external thread formed on the solid cylindrical post 51 of the disk clamp 50. The disk clamp 50 of this embodiment also includes a downward projecting peripheral ring 53a protruding from the lower surface of dome-shaped member 53. Thus the downward projecting peripheral ring 53a is also brought into contact with the clamp spacer 24' and applies pressure to the clamped information storage disks 21, 22.

In the disk drive spindle motor hub assembly as constructed according to the principles of the present invention, the annular groove formed in the spindle motor hub and cylindrical post of the disk clamp are advantageously used to secure the stack of information storage disks to the spindle motor hub in the most efficient, compact and cost productive manner. When installing information storage disks by the spindle hub assembly constructed according to the principles of the present invention, separate screws are not required (although they may be optionally available), an adverse impact imposed on the flatness of the disk surfaces can be minimized and the influence of motor vibration and external shocks can also be minimized. As a result, operational errors of the storage disks are prevented, thereby improving the recording/reproducing capability of the disks.

While there have been illustrated and described what are considered to be preferred embodiments of the present invention, it will be understood by those skilled in the art that various changes and modifications may be made, and equivalents may be substituted for elements thereof without departing from the true scope of the present invention. For example, it should be appreciated that a wide variety of materials may be used to form the disk clamp. Further, the dimensions of the upwardly extending peripheral ring of the top portion of the spindle hub and the downwardly projecting peripheral ring of the disk clamp, as well as the number of screws used may be widely varied. Additionally, although the invention has been described in conjunction with its application to a particular Winchester-type disk drive, it should be appreciated that the disk drive spindle hub assembly described may be applicable to a wide variety of information storage devices. Therefore, it is intended that the present invention not be limited to the particular embodiment disclosed as the best mode contemplated for carrying out the present invention, but that the present invention includes all embodiments falling within the scope of the appended claims.

What is claimed is:

1. A disk drive spindle hub assembly, comprising:

a spindle hub having a top portion and an enlarged spindle base, said top portion having a top end surface, a generally annular groove within said top end surface and a remaining portion of said top end surface radially outward from said annular groove forming an upwardly extending peripheral ring of a first diameter, said annular groove having an inner cylindrical wall, an outer cylindrical wall and an internal thread formed on said outer cylindrical wall;

a stack of information storage disks journaled about said spindle hub in a spaced-apart, coaxially aligned relation, said information storage disks being coupled to said spindle hub to rotate with said spindle hub;

spacer means positioned between adjacent ones of said information storage disks, for spacing said disks apart in the coaxially aligned relation of said spindle hub;

a clamp spacer having an annular axial face and a central circular opening concentrically disposed on said spindle hub, said annular axial face directly facing a surface of a top information storage disk; and a disk clamp for concentrically clamping the stack of information storage disks in coaxial alignment with said spindle hub in compression against the clamp spacer, said disk clamp having a head portion, a downwardly projecting peripheral ring of a second diameter having a bottom surface sitting on said clamp spacer, and a hollow cylindrical post extending from the center of said head portion for accommodating the inner cylindrical wall of the annual groove of said spindle hub, and having an external thread formed on an outer surface for mutually engaging with the internal thread formed on the outer cylindrical wall of said annular groove of said spindle hub, when said disk clamp engages the top portion of said spindle hub for concentrically securing the stack of information storage disks to said spindle hub.

2. The disk drive spindle hub assembly of claim 1, further comprised of said second diameter of the downwardly projecting peripheral ring of the disk clamp being greater than said first diameter of the upwardly extending peripheral ring of the top portion of the spindle hub.

3. The disk drive spindle hub assembly of claim 1, further comprised of said spacer means and said clamp spacer being resilient for enabling the information storage disks to expand and contract radially relative to the spindle hub to avoid axial and radial displacements of the clamped information storage disks.

4. The disk drive spindle hub assembly of claim 1, further comprised of the head portion of said disk clamp having a doughnut-shape with a perforated hole at the center region extending through said hollow cylindrical post, for accommodating the inner cylindrical wall of the annular groove of said spindle hub, when said disk clamp is screwed into said annular groove of said spindle hub.

5. The disk drive spindle hub assembly of claim 4, further comprised of said perforated hole of said disk clamp extending through said hollow cylindrical post being polygonal for enabling an angular wrench to screw said disk clamp onto the top portion of said spindle hub.

6. The disk drive spindle hub assembly of claim 4, further comprised of the head portion of said disk clamp having a plurality of screw holes for allowing corresponding screws to additionally secure the disk clamp after said disk clamp is screwed into the annular groove of said spindle hub.

7. The disk drive spindle hub assembly of claim 1, further comprised of the head portion of said disk clamp having a plurality of screw holes for allowing corresponding screws to additionally secure the disk clamp after said disk clamp is screwed into said annular groove of said spindle hub.

8. The disk drive spindle hub assembly of claim 1, further comprised of said head portion of said disk clamp having a domed shape.

9. The disk drive spindle hub assembly of claim 8, further comprised of said second diameter of the downwardly projecting peripheral ring of the disk clamp being greater than said first diameter of the upwardly extending peripheral ring of the top portion of the spindle hub.

10. The disk drive spindle hub assembly of claim 9, further comprised of said spacer means and said clamp spacer being resilient for enabling the information storage disks to expand and contract radially relative to the spindle hub to avoid axial and radial displacements of the clamped information storage disks.

11. The disk drive spindle hub assembly of claim 10, further comprised of said hollow cylindrical post of said disk clamp securely accommodating mutual engagement of the external and internal threads, when said disk clamp is screwed into said annular groove of said spindle hub for concentrically securing the stack of information storage disks to said spindle hub.

12. The disk drive spindle hub assembly of claim 1, further comprised of said head portion of said disk clamp having a domed shape and said hollow cylindrical post of said disk clamp securely accommodating mutual engagement of the external and internal threads, when said disk clamp threadingly engages the spindle hub for concentrically securing the stack of information storage disks to said spindle hub.

* * * * *